July 10, 1956  E. E. MARX  2,753,740
DRILLING AND REAMING JIG
Filed Sept. 11, 1953
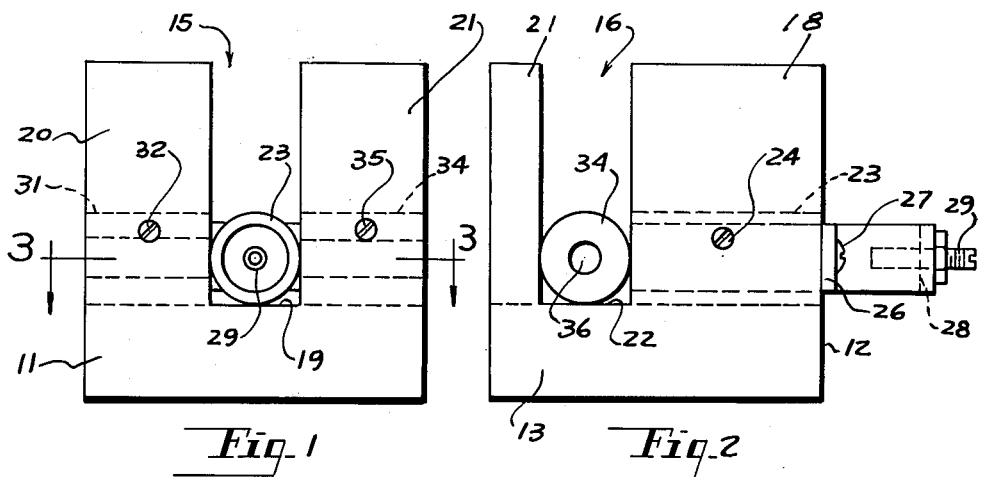
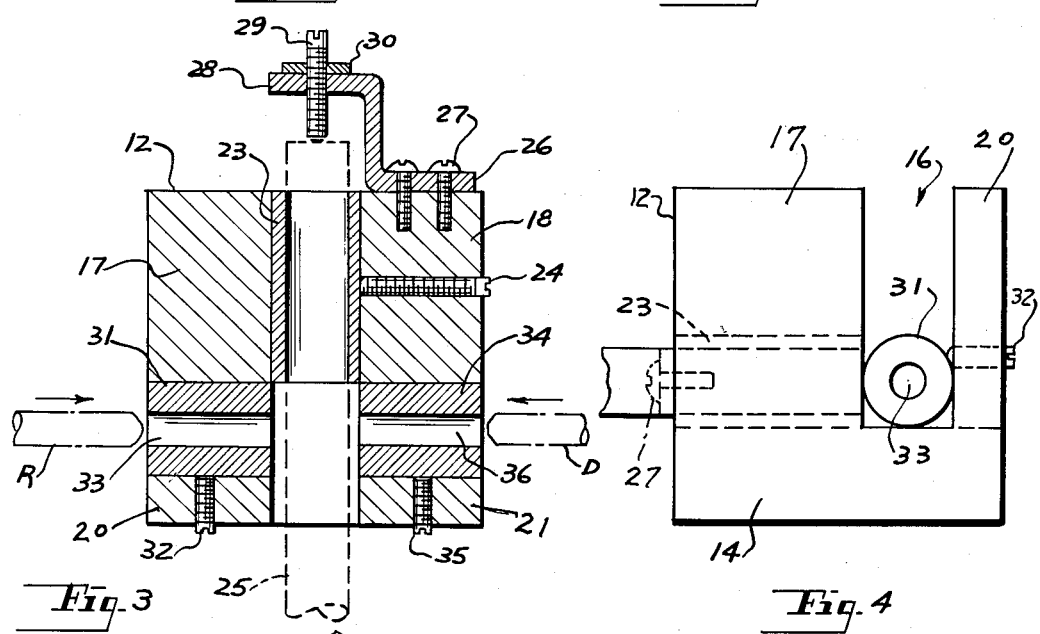
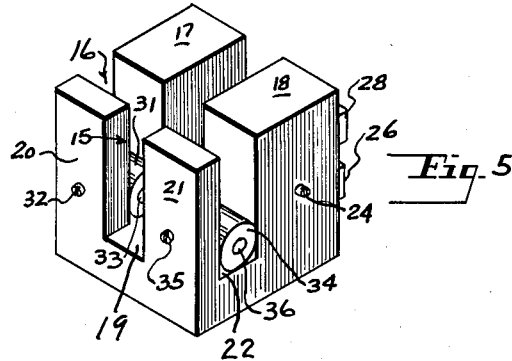
INVENTOR.
EDWARD E. MARX
BY
Robert A. Sloman
ATTORNEY.

United States Patent Office 2,753,740
Patented July 10, 1956

2,753,740

DRILLING AND REAMING JIG

Edward E. Marx, Royal Oak, Mich.

Application September 11, 1953, Serial No. 379,707

4 Claims. (Cl. 77—62)

This invention relates to a drilling and reaming jig, and more particularly to a device for accurately drilling and reaming cross holes in cylindrical pieces.

It is the object of the present invention to provide a jig, which is so constructed as to accurately support a workpiece and to provide for the accurately positioning of guide means for the transverse drilling and reaming of cross holes within such workpiece without removal thereof.

It is the further object of the present invention to provide interchangeable bushings and liners within a transversely slotted jig block with said bushings and liners properly locked and immovably retained in said slots which are accurately machined and wherein the jig block is true and square on all sides.

These and other objects will be seen from the following specification and claims in conjunction with the appended drawing, in which:

Fig. 1 is a front elevational view of the drilling and reaming jig.

Fig. 2 is a right side elevational view thereof.

Fig. 3 is a plan section taken on line 3—3 of Fig. 1.

Fig. 4 is a left side elevational view of the jig block; and

Fig. 5 is a perspective view thereof.

It will be understood that the above drawing illustrates merely a preferred embodiment of the invention, and that other embodiments are contemplated within the scope of the claims hereafter set forth.

Referring to the drawing, the present drilling and reaming jig consists of a metallic block, which is perfectly true and square on all of its sides, which block includes the upright front and rear walls 11 and 12, and the opposed side walls 13 and 14.

Machined within the block shown in Fig. 5, are a pair of upright transverse right angularly intersecting slots 15 and 16, each of rectangular cross-section. Slot 15 defines the spaced upright walls 17 and 18 with flat surfaced bottom wall 19 therebetween adapted to receive the interchangeable bushing 23 through which is projected the workpiece 25.

Transverse slot 16 defines the additional upright front walls 20 and 21 spaced forwardly of walls 17 and 18 with flat bottom wall 22 therebetween adapted to receive the guide bushings 31 and 34, as indicated in Fig. 3.

The work-receiving liner or bushing 23 of a fixed exterior diameter to cooperatively register with walls 17 and 18, rests upon the flat bottom surface 19 and is immovably secured thereon by the transverse set screw 24. This set screw is arranged above the center line of bushing 23 to frictionally engage said bushing and at the same time hold down said bushing within slot 15.

The cylindrical workpiece 25 of an exterior diameter to slidably cooperate with the interior surface of bushing 23, is supportably slid through said bushing till it engages the adjustable stop screw 29 to thereby properly locate said workpiece with respect to the guide bushings 31 and 34. Bracket 26 is secured to the rear wall 12 of the block by the screws 27, and includes the rearwardly spaced bracket element 28 which extends centrally across the longitudinal axis of workpiece 25 and threadedly receives the adjustable set screw 29 which has a suitable lock nut 30.

Bushing 23 is interchangeable with other bushings of different internal diameter for receiving workpieces of different diameter, however the exterior diameter of such interchangeable workpiece receiving bushings should be constant for cooperative nesting within the accurately machined slot 15.

Bushing 34 with central cylindrical aperture 36 is positioned in one end of slot 16 between the block walls 18 and 21, and rests upon the machined flat bottom 22. Guide bushing 34 adapted to guidably receive the drill D through opening 36, is immovably retained in position by the set screw 35, which threadedly extends through wall 21 and operatively and retainingly engages guide bushing 34. Here also, said set screw is above the center line of bushing 34 for more effectively retaining said bushing and holding the same down within one end of slot 16.

Opposed from bushing 34 and arranged in spaced relation therefrom at the opposite end of slot 16 is a second guide bushing 31, having an elongated bore 33 for receiving the reaming tool R. Bushing 31 is positioned between walls 17 and 20 and rests upon the flat surface 22, and is immovably secured and held down within said slot by the set screw 32. Here also, the latter set screw is arranged above the center line of bushing 31.

It is contemplated that the drill guide bushing 34 and the reamer guide bushing 31 be aligned axially with each other, so that without removing the workpiece 25, the transverse cross hole produced by drill D may be reamed by the reaming tool R.

It is furthermore contemplated that the workpiece be suitably retained in position for the drilling and reaming operation.

The guide bushings 34 and 31 are naturally interchangeable with other guide bushings of the same exterior diameter, but with variable internal diameters for drill and reaming other holes of different sizes.

Having described my invention, reference should now be had to the claims which follow, for determining the scope thereof.

I claim:

1. A drilling and reaming jig comprising a cubical block with front, rear, top and side walls and having formed therein a pair of upright right angularly intersecting slots of rectangular shape in cross section parallel respectively to said front and side walls, opening in said top wall and extending between said front, rear and side walls throughout the height of the slots, a bushing secured within said block in one of said slots for supportably receiving a cylindrical workpiece extending through said slot, and a pair of opposed longitudinally spaced drill and reamer guide bushings secured within said block in the other slot positioned upon opposite sides of said workpiece, whereby a transverse opening may be successively drilled and reamed in said workpiece through said guide bushings, said slots being of an appreciable height in excess of the diameter of said bushings.

2. The jig of claim 1, and set screws threadedly engaging said block extending at right angles to and retainingly engaging and securing said bushings within said block.

3. The jig of claim 1, and set screws threadedly engaging said block extending at right angles to and retainingly engaging and securing said bushings within said block, said set screws lying in a plane above the center line of said bushings.

4. The jig of claim 1, the surfaces formed in said block forming the bottom walls of said slots being perfectly flat and coplanar to supportably receive said bushings.

References Cited in the file of this patent

UNITED STATES PATENTS

| | | |
|---|---|---|
| 919,823 | Childs | Apr. 27, 1909 |
| 2,435,256 | Whitmore | Feb. 3, 1948 |
| 2,475,263 | Staggs | July 5, 1949 |

FOREIGN PATENTS

| | | |
|---|---|---|
| 305,107 | Great Britain | Jan. 25, 1929 |